US008224127B2

(12) United States Patent
Woodard et al.

(10) Patent No.: US 8,224,127 B2
(45) Date of Patent: Jul. 17, 2012

(54) SYNTHESIS OF DATABASES OF REALISTIC, BIOLOGICALLY-BASED 2-D IMAGES

(75) Inventors: Jeffrey Woodard, Oakton, VA (US); Amlan Kundu, Ashburn, VA (US); Monica Carley-Spencer, McLean, VA (US)

(73) Assignee: The Mitre Corporation, McLean, VA (US)

( * ) Notice: Subject to any disclaimer, the term of this patent is extended or adjusted under 35 U.S.C. 154(b) by 995 days.

(21) Appl. No.: 11/797,323

(22) Filed: May 2, 2007

(65) Prior Publication Data
US 2008/0273743 A1 Nov. 6, 2008

(51) Int. Cl.
*G06K 9/80* (2006.01)
*G06K 9/40* (2006.01)
(52) U.S. Cl. ........ 382/305; 382/115; 382/131; 382/209; 382/278; 707/736
(58) Field of Classification Search .................. 382/305, 382/115, 131, 209, 275; 707/736
See application file for complete search history.

(56) References Cited

U.S. PATENT DOCUMENTS

| | | | |
|---|---|---|---|
| 7,603,000 B2 * | 10/2009 | Zheng et al. ................... | 382/305 |
| 2003/0110163 A1 * | 6/2003 | Chen et al. ......................... | 707/3 |
| 2008/0089591 A1 * | 4/2008 | Zhou et al. ..................... | 382/224 |

OTHER PUBLICATIONS

Wang, et al. (2005). Translation insensitive similarity in complex wavelet domain. Proc. IEEE Conf. Acousting, Speech & Signal Processing, 2, 573-576.*
Prastawa, et al. (2005). Synthetic ground truth for validation of brain tumer mri segmentation. LNCS: Medical image Computing and Computer Assisted Intervention, 3749, 26-33.*
Yanushkevich, S.N. (2006). Synthetic biometrics: a survey. International Joint Conference on Neural Networks, 676-683.*
Cappelli, et al. (2000). Synthetic fingerprint-image generation. 15th International Conference on Pattern Recognition (ICPR'00), 3, 471-474.*
Landreu, et al. (2006). Image database generation using image metric constraints: an application within the caladiom project. SPIE Proc. Automatic Target Recognition XVI, 6234, 1-12.*
Kak, et al. (2000). Computer vision for content-based image retrieval from large medical databases. Proc. IAPR Workshop on Machine Vision Applications, 1-10.*
Carley-Spencer, Monica, "Advanced Image Retrieval for Neuroinformatics", http://www.mitre.org/news/the_edge/spring_05/spencer.html, MITRE, The Edge, 2005, 4 pgs.*
Wang, et al. (2004). Image quality assessment: from error visibility to structural similarity. IEEE Transactions on Image Processing, 13(4), 1-14.*
Wang, Z, & Simoncelli, E. (2004). Stimulus synthesis for efficient evaluation and refinement of perceptual image quality metrics. SPIE Human Vision and Electronic Imaging IX, 5992, 1-10.*

(Continued)

*Primary Examiner* — Michael A Newman
(74) *Attorney, Agent, or Firm* — Sterne, Kessler, Goldstein & Fox P.L.L.C.

(57) ABSTRACT

A method and computer program product to create an unlimited number of synthetic but realistic, biologically-based, 2-D images like irises and magnetic resonance images (MRIs), as well as other images is presented. New metrics for measuring the mathematical distance of such synthetic images from a source (original) image have also been proposed. These metrics and the synthesis procedure are applicable to the development of image retrieval systems. The presented method can be extended to synthetic images of non-biological origins too.

18 Claims, 5 Drawing Sheets

OTHER PUBLICATIONS

Wang, et al. (2005). Translation insensitive similarity in complex wavelet domain. Proc. IEEE Conf. Acoustic, Speech & Signal Processing, 2, 573-576.*

Jiuzhou, Zhao. (2006). Creation of Synthetic Chart Image Database with Ground Truth. Department of Computer Science, National University of Singapore, Pulau Bukom, Singapore. Retrieved from http://www.comp.nus.edu.sg/labs/chime/de/chart_dataset/Report_Zhaojiuzhou.pdf.*

Carley-Spencer, Monica, "Advanced Image Retrieval for Neuroinformatics", http://www.mitre.org/news/the_edge/spring_05/spencer.html, MTIRE, The Edge, 2005, 4 pgs.*

Antani, et al. (2004). Content-based image retrieval for large biomedical image archives. MEDINFO, 829-833.*

Albin, et al. "Quality Image Metrics for Synthetic Images Based on Perceptual Color Differences." IEEE Transactions on Image Processing. 11.9 (2002): 961-971. Print.*

McNamara, Ana. "Visual Perception in Realistic Image Synthesis." Eurographics '01. (2001): 1-15. Print.*

Jayant, N. and Noll, P., *Digital Coding of Waveforms: Principles and Applications to Speech and Video*, Englewood Cliffs: Prentice Hall, 1984, whole book.

Jacobs, D., Belhumeur, P., and Basri, R, "Comparing Images under Variable Illumination," *1998 IEEE Computer Society Conference on Computer Vision and Pattern Recognition Proceedings* (CVPR'98), 1998, pp. 610-617.

Kundu, A., Mitra, S, and Vaidyanathan, P., "Application of Two-Dimensional Generalized Mean Filtering for Removal of Impulse Noises from Images", *IEEE Transactions on Acoustics, Speech, and Signal Processing*, vol. ASSP-32, No. 3, Jun. 1984, pp. 600-609.

Markel, J., and Gray, A., *Linear Prediction of Speech*, Springer-Verlag, Berlin Heidelberg, 1976, whole book.

Wang, Z., Bovik, A., and Lu, L., "Why is Image Quality Assessment so Difficult?" *Proceedings, IEEE International Conference on Acoustics Speech and Signal Processing*, vol. 4, 2002, pp. 3313-3316.

Wang, Z., Bovik, A., Sheikh, H., & Simoncelli, E., "Image Quality Assessment: From Error Visibility to Structural Similarity," *IEEE Transactions on Image Processing*, vol. 13, No. 4, Apr. 2004, pp. 600-612.

Wang, Z. & Simoncelli, E., "Translation Insensitive Image Similarity in Complex Wavelet Domain," *IEEE International Conference on Acoustics, Speech, and Signal Processing, 2005,* (ICASSP '05). IEEE International Conference on, vol. 2, Mar. 18, 2005, pp. 573-576.

Wang, Z., and Simoncelli, E., "Reduced-Reference Image Quality Assessment Using a Wavelet-Domain Natural Image Statistic", *Proceedings, Human Vision and Electronic Imaging X*, SPIE vol. 5666, 2005, pp. 149-158.

Wang Z. & Simoncelli, E., "Stimulus Synthesis for Efficient Evaluation and Refinement of Perceptual Image Quality Metrics," *Human Vision and Electronic Imaging IX*, SPIE vol. 5292, Jan. 2004, pp. 99-108.

Woodard, J. & Carley-Spencer, M. "No-Reference Image Quality Metrics for Structural MRIs", *Neuroinformatics*, vol. 4, No. 3, Sep. 2006, pp. 243-262.

Yager, R., "The Power Law Operator," *IEEE Trans. Systems, Man, & Cybernetics*, vol. 31, No. 6, Nov. 2001, pp. 704-731.

Shah, et al., "Enhanced Iris Recognition: Algorithms for Segmentation, Matching and Synthesis", West Virginia University, abstract only, 1 page, (2006).

Zuo, et al., "A Model Based, Anatomy Based Method for Synthesizing Iris Images", ICB 2006, LNCS 3832, Springer-Verlag Berlin Heidelberg 2005, pp. 428-435.

Makthal, et al., Synthesis of Iris Images Using Markov Random Fields, Proceedings of the 13$^{th}$ European Signal Processing Conference (EUSIPCO), Antalya, Turkey, Sep. 2005, 4 pgs.

http://www.its.bldrdoc.gov/vqeg/, VQEG, created Feb. 2, 2002, last updated Jul. 10, 2007, 1 pg.

* cited by examiner

SYNTHESIS OF DATABASES OF REALISTIC, BIOLOGICALLY-BASED 2-D IMAGES

BACKGROUND OF THE INVENTION

1. Field of the Invention

The present invention is directed towards a method of creating a realistic corpus of synthetic biologically based images subject to controlled constraints.

2. Background Art

The development of automated biological image processing applications including biometric identification and recognition, and classification for disease diagnoses and other medical research is restricted by the fact that there is a usually a lack of sufficient numbers of such images available for accurate study. Types of images can include, but are not restricted to, irises, magnetic resonance images (MRIs), x-rays, etc. The main reasons for the lack of such images are the high cost of image collection and, in the case of human subjects, the privacy and proprietary restrictions on sharing images. Furthermore, the limited set of images that exist and are actually available do not possess the systematically controlled variability necessary for thorough testing and evaluation of image processing algorithms. Therefore, it would be practically and financially beneficial to be able to synthesize a realistic corpus of such images.

Implicit in a image synthesis method is the process of quantitatively comparing one image with another. A problem in comparing two images is that traditional metrics of measuring mathematical distance between an original image and a synthesized or a distorted image do not adequately measure the perceptual correlation between the two images. That is, two images having a very small distance between them might actually look very different perceptually (when viewed by the human eye) and vice versa. This is because of the fact that human visual perception is highly adapted for extracting structural information from an image, which does not necessarily correlate with traditional mathematical distance metrics; hence the need exists for perceptually meaningful metrics for comparing images. Thus, what is also needed is a novel family of perceptually meaningful distance metrics for assessing full-reference image quality in the synthesis procedure. Besides the main purpose of synthesis, these metrics should also be applicable to content-based image retrieval (CBIR), described next.

With large image repositories, there is a need for an efficient means for searching and retrieving images based on particular image features of interest. Conventional approaches to image search and retrieval rely on annotations made to the images by a person a priori, but a CBIR system allows users to search a repository of images based on intrinsic image features (i.e., features that characterize edges, textures, and contours of interest) that are not necessarily captured by annotations or other supporting data. Traditional CBIR techniques for photographs that compare histograms of pixel colors/intensities are ineffective for the types of biological imagery described earlier because the histograms of individual images of these types tend to be too similar to provide discrimination. Accordingly, there is a further need for mathematically defined perceptually-based metrics that are more useful for comparing images for CBIR queries.

BRIEF SUMMARY OF THE INVENTION

The present invention addresses the needs mentioned above and the associated problems. To overcome the dearth of synthetic images that would be extremely beneficial for developing, among other things, biometric identification tools and medical image processing applications, creation of a realistic corpus of synthetic biologically based images subject to controlled constraints is described. The synthesis method relies on measuring the mathematical distance between two images. The term mathematical distance refers to the difference between any two images as measured in terms of quantitative metrics. Metrics that correlate well with how the human eye perceives differences among images will be referred to as perceptual distance metrics.

A real original image is used as a starting point in the creation of a synthetic database. The real image is distorted by adding noise. Following this step, a synthetic image is created by iteratively modifying the distorted image using optimization techniques so as to maximize (or minimize) a perceptual distance between the distorted image and the original image. The optimization is constrained so that the synthetic image always possesses the same fixed mathematical distance to the original image as the distorted image does. In this way, a synthetic image can be created that possesses strong or weak perceptual similarity to the original, while at the same time possessing a prescribed mathematical distance. The technique can be used to create an unlimited number of synthetic images that look perceptually indistinguishable from real images.

The synthesis procedure ensures that salient features and sources of variability are similar to what would be expected in a corpus collected from real life scenarios. The net effect is an enormous cost savings and a timely availability of data for scientific and engineering development.

In one embodiment of the present invention, a novel family of perceptually motivated distance metrics is used to assess relative image quality as part of the synthesis procedure. These metrics are a function of statistics that are computed individually over each of two images being compared. The metrics are invariant to translation and rotation, which is a very desirable property given the natural variability in orientation of many biologically-based images.

The invention is especially powerful for CBIR systems designed to search datasets for images based on visual similarity. The new metrics can also be used to compare images for CBIR queries. The synthesis approach itself offers a technique for evaluating the efficacy of candidate distance metrics that a CBIR system may use, while the resultant set of synthetic images can provide data necessary to conduct a preliminary evaluation of system performance.

While this invention is being described in terms of biological images, after reading this disclosure, the concepts explained herein can also be easily adapted for other purposes, such as applications involving surveillance imagery and video.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Introduction

Figure 1:
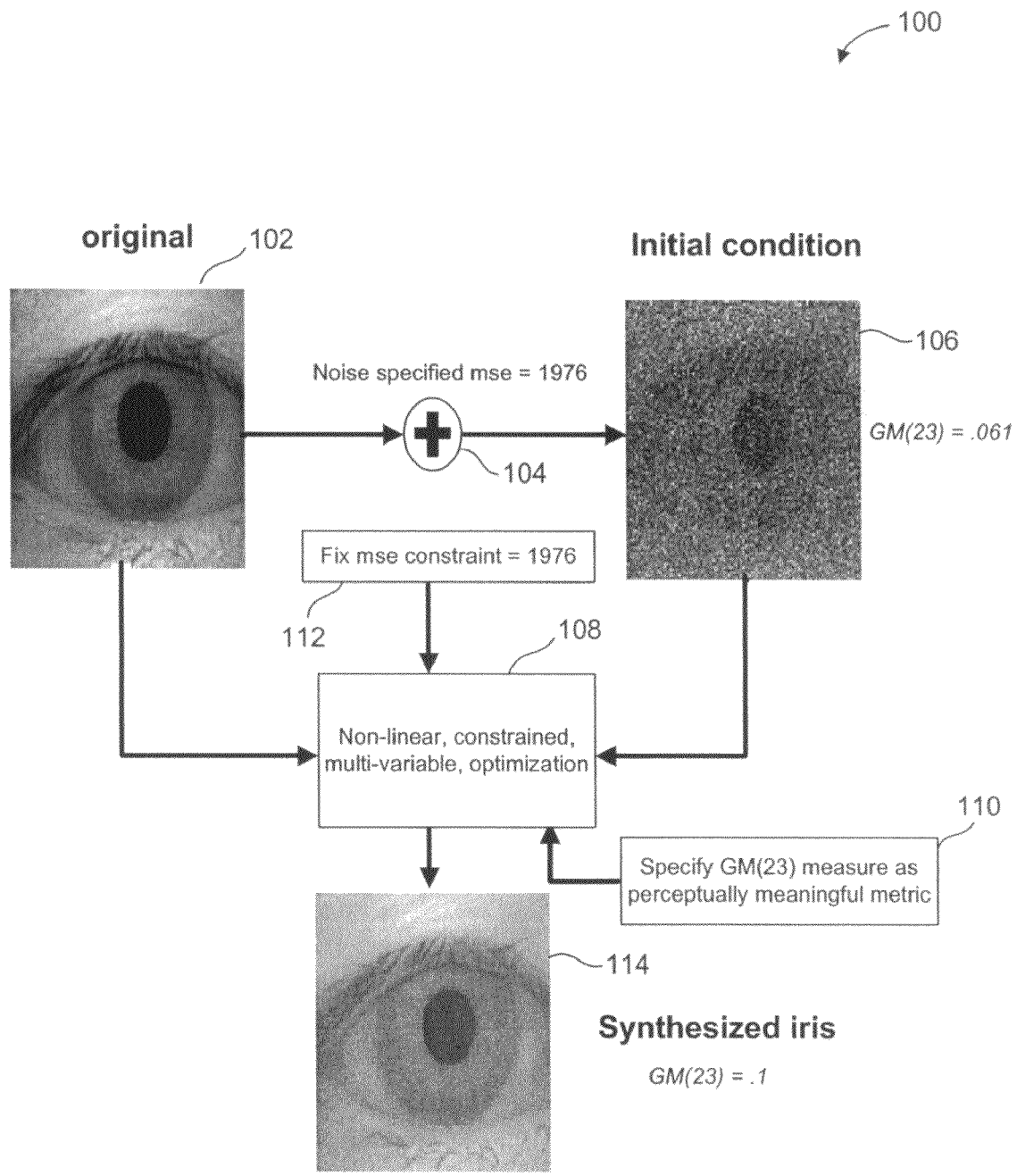
FIG. 1 illustrates a method for creating a synthetic image from an original image, according to one embodiment of the present invention.

According to one embodiment of the invention, a system and method is used to create an unlimited number of synthetic, realistic, biologically-based, 2-D images like irises and MRIs, as well as other images, including natural images. The collection of databases or corpa of biologically-based images like irises and MRIs is a time-consuming and expensive task. The collection process is made more challenging because privacy issues prevent widespread collection of data. Precise testing of MRI retrieval systems or iris biometric classification systems for example, is then difficult because of a paucity of data necessary to establish necessary statistical confidence in such systems.

Data that is currently available lack systematically controlled variability. It is then difficult to systematically determine the sensitivity of these systems to image variations capturing the full diversity of possibilities that can occur in the real world. Therefore, it would be practically and financially beneficial to be able to synthesize such a corpus. The models used in the synthesis, according to various embodiments of the present invention, ensure that salient features and sources of variability are similar to what would be expected in a large and extensive corpus collected from real life scenarios. In fact, a corpus could be synthesized so that it models the types of distortions found in real images collected in a particular laboratory. Furthermore, the images can be synthesized to reflect intra-subject variability. The net effect is enormous cost savings and timely availability of data for scientific and engineering development. The generation of an unlimited number of carefully-controlled, biologically-based (or other) images, which are indistinguishable or nearly indistinguishable from real images, will dramatically help in the development, testing and evaluation of such systems.

According to another embodiment of the present invention, novel metrics for comparing two images are defined. These metrics are called full-reference image quality measures (or distortion measures). To synthesize an image an original image that is perturbed or modified in a carefully prescribed and controlled way is taken as a starting point. The type and amount of modification is determined by the full-reference image quality measure, which is therefore crucial to synthesis of images. The full-reference image quality measures defined according to various embodiments of the invention provide one or more perceptually meaningful full-reference image quality measures (or, a family of quality measures) which are used in image synthesis procedures, described elsewhere in this specification. The full-reference image quality measures allow the generation of highly realistic synthetic images and thus image databases. The full-reference image quality measures can also be applied in other applications like content-based image retrieval (CBIR) or automatic image understanding. Other applications of the full-reference image quality measures can be contemplated by those skilled in the art, after reading this specification.

Previous methods for image or texture synthesis have usually been based on parametric, e.g., statistical models which rarely provide the realism necessary. The methods for texture synthesis in particular are not designed to synthesize images that look similar to a particular (or pre-selected) original image. Rather, they synthesize images that look similar to a broad class or family of images. Wang et al. have developed non-parametric methods to synthesize images, as described in the following publications:

Wang, Z. Bovid, A., Sheikh, H., & Simoncelli, E., "Image quality assessment: From error visibility to structural similarity," *IEEE Transactions on Image Processing*, vol. 13, no. 4, April 2004;

Wang, Z. & Simoncelli, E., "Translation Insensitive Image Similarity In Complex wavelet Domain," *Acoustics, Speech, and Signal Processing*, 2005. Proceedings. (ICASSP '05). IEEE International Conference on, Volume 2, Mar. 18-23, 2005 Page(s): 573-576;

Wang, Z., and Simoncelli, E. (2005) Reduced-reference image quality assessment using a wavelet-domain natural image statistic. *Proceedings, Human Vision and Electronic Imaging*. X; and Wang Z. & Simoncelli, E., and Bovik, A., "Stimulus synthesis for efficient evaluation and refinement of perceptual image quality metrics," *Human Vision and Electronic Imaging IX*, vol. 5292, January 2004).

Their methods have been described in the context of evaluating quality measures used to characterize the compression of individual images. Furthermore, the reported quality measures previously used for synthesis have been restricted to the mean-square error (MSE) and a more perceptually based family of metrics called the structural similarity measure (SSIM), as additionally described in the publication Wang, Z., Bovik, A., and Lu, L. (2002a) "Why is image quality assessment so difficult?" *Proceedings, IEEE International Conference on Acoustics Speech and Signal Processing*. 4, 3313-3316. This work has demonstrated the viability of specific, non-parametric synthesis techniques for individual images, and the perceptual significance of the SSIM. However, various embodiments of the invention:

(1) change the purpose of the synthesis of images from evaluating quality measures and instead create prescribed (or controlled) variability to individual images, then (2) extend the synthesis from individual images to entire databases, and finally, (3) develop a new family of perceptually based quality measures that are an improvement on conventional quality measures like the SSIM.

Further, conventional art does not describe a non-parametric method to generate synthetic databases of realistic, biological-based images, particularly in concert with the novel quality metrics to be described below.

Description of Synthesis of Individual Images.

FIG. 1 describes a method 100 for non-parametric synthesis of individual images according to an embodiment of the invention. A real original image 102 is used as a starting point. A distorted initial condition image 106 (also referred to as "distorted image 106") is created by adding noise at adder operation 104. A synthetic image 114 is created by iteratively modifying distorted image 106 using optimization techniques shown by box 108. Synthesized image 114 pixels are regarded as variables to be changed in the iterative optimization. Therefore, the number of variables equals the number of pixels. The optimization is constrained so that synthetic image 114 always possesses a same fixed mathematical distance, $QM_1$, to original image 102 as does distorted image 106. However, the optimization also affects (i.e., maximizes or minimizes) a perceptually-based distance measure $QM_2$ to the original image.

In the example in FIG. 1, a human eye is used as original image 102. The first quality measure $QM_1$ was defined as the MSE, as an example and not as a limitation. Those skilled in the art can, after reading this disclosure, contemplate that the herein discussed technique is equally applicable using other quality measures. The initial condition image 106 was created by adding noise so that the MSE=1976. The second quality measure $QM_2$ is defined from the new class of quality measures of the present invention, denoted in the figure as a generalized mean (GM) GM(23), described below. Initial condition image 106 possesses a GM(23) of only 0.061, and reflects poor similarity to original image 102. It can be seen that the optimization 108 changed the pixels of initial condition image 106 so that synthesized image 114 possesses a higher GM(23) of 0.1. Synthesized image 114 looks much more similar to original image 102 than does initial condition image 106. However, according to an embodiment of the present invention, synthesized image 114 is constrained to have the same MSE to original image 102 as does initial condition image 106, namely MSE=1976. Synthesized image 114 can be outputted to an output device like a screen or a memory device.

The optimization can proceed with many standard techniques, including but not limited to gradient descent. For an embodiment of this method, the two quality measures or distances, $QM_1$ and $QM_2$, are mathematically differentiable. Using such a constrained, nonlinear, multivariable optimization, synthetic image 114 can be created that possesses an excellent (or poor) perceptual distance $QM_2$ to original image 102, while at the same time, also possessing a prescribed mathematical distance, $QM_1$. The technique can be used to create an unlimited number of synthetic images which look nearly indistinguishable from real images.

Discussion of Image Quality Metrics

Quality assessment of images is necessary in a variety of systems that process digital images and other signals. An important and widely studied example is lossy compression. Here, signal quality is quantified by comparing digital representations of input and output of a compression system. Digital representations could include the discrete images (or other signals) themselves, frequency-domain transformations, feature sets, probabilistic models, etc.

In distinction to subjective measures which rely on human judgments, automated or objective measures are described in this specification which are specified algorithmically. Among other desirable qualities of a full-reference quality measure, the Video Quality Experts Group (www[dot]vqeg[dot]org) has identified the ability of the full-reference quality measure to accurately predict human judgments of distortion as one of the most difficult to achieve. Also, the full-reference quality measure should be monotonically related to the level of distortion and provide reasonably consistent results across a wide variety of images. To the list above, one could add additional desirable properties like mathematical tractability, simplicity, robustness to variations in alignment, scaling and orientation, and computational efficiency.

In this description, a particular original two-dimensional image is denoted by X, and Y is a distorted or synthesized version of X, where the letters denote a two-dimensional matrix of pixel values. Individual pixel values are denoted by $x_{ij}$ or $y_{ij}$, for the pixel at the $i_{th}$ row and $j_{th}$ column. Pixel values are often scaled to eight bits, and so are in the range 0 to 255. Thus the MSE is the expected value approximated by the average value: $E[(X-Y)^2]$, where $E[.]$ represents the expectation.

The SSIM is a family of quality measures which is based in part on considerations of the human visual processing system, including its responses to such characteristics as luminance, contrast, and structure. The SSIM has been shown to exhibit much better correlation with the human judgments of the similarity of two images than the MSE. However, it also has some weaknesses. The SSIM is comprised of:

(1) functions of each image considered separately, e.g., a mean, standard deviation, or variance of an image's pixel intensities, and (2) functions of both images, e.g., a cross-correlation.

The first weakness of the SSIM is that because it is a function of two images, it is sensitive to even small misalignment between the images. Wang et al. attempt to provide some protection of the SSIM for very small misalignments in rotation or translation, but not large misalignments. This is unlike the human visual system, which is not nearly as sensitive to these effects.

The second weakness is that, the SSIM has difficulty with images which contain large flat or nearly constant regions, which occur frequently in irises or MRIs, for example. This shortcoming is perhaps due to the fact that SSIM emphasizes structural features, which are not present in large, flat surfaces.

Description of Synthesis of Databases

According to one embodiment of the invention, the synthesis technique can be expanded from individual images to entire databases of images. This is illustrated in FIG. 2.

Figure 2:
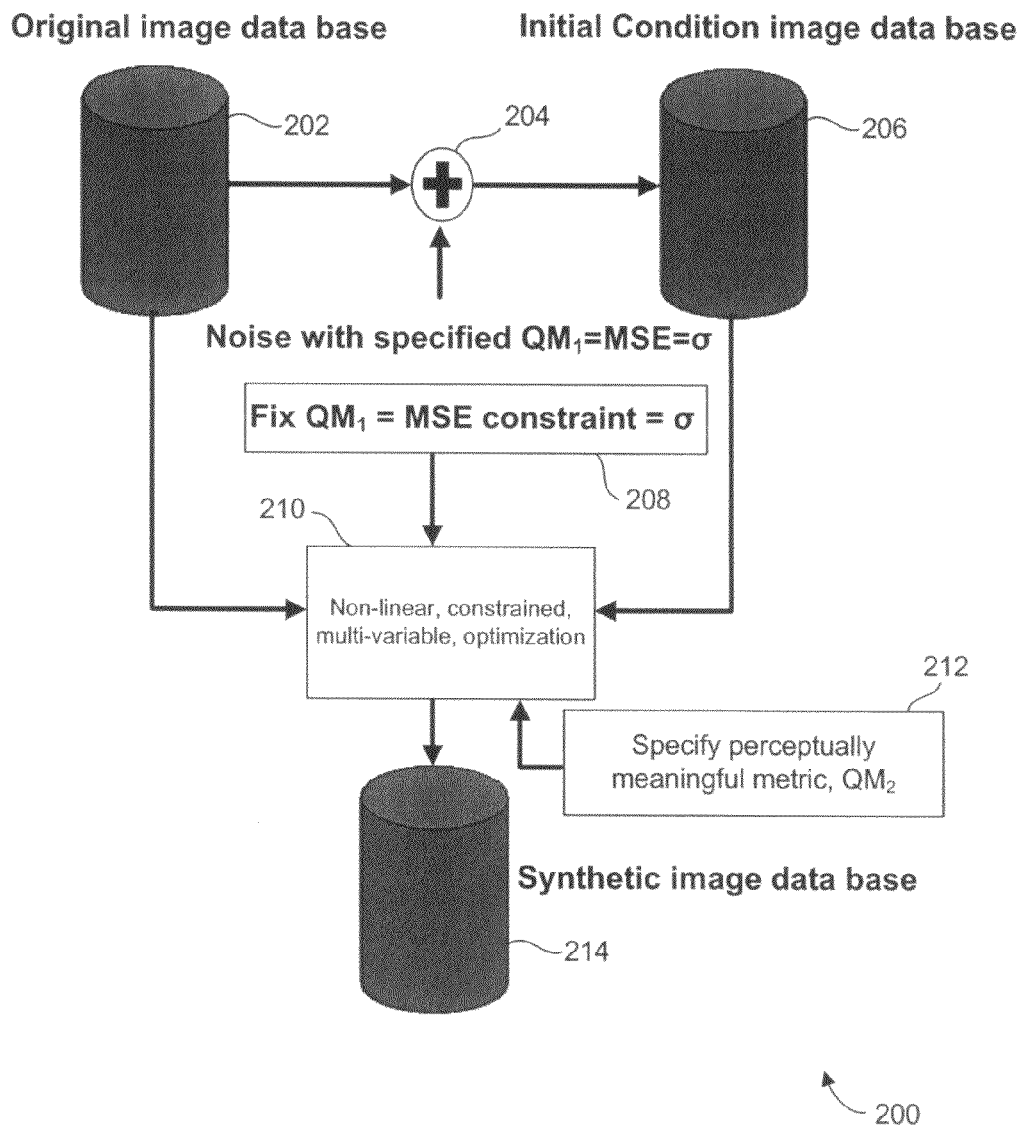
FIG. 2 illustrates a method for creating a database of synthetic images from a database of original images, according to a second embodiment of the invention.
Figure 3A:
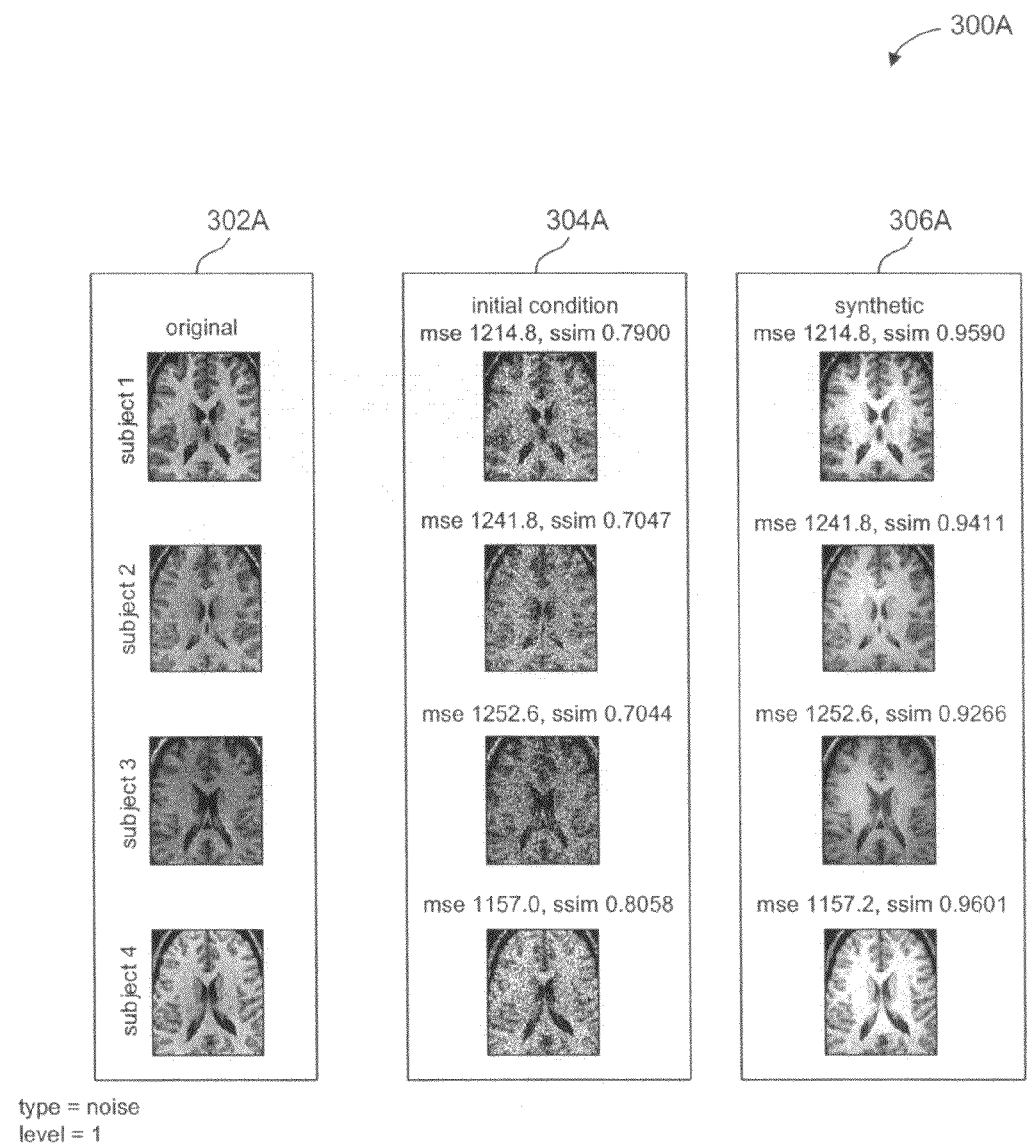
FIGS. 3A and 3B illustrate the results of an optimization procedure using a conventional quality metric.
Figure 3B:

Original database 202 in FIG. 2 consists of a collection of original images (not shown in FIG. 2, for sake of brevity). An initial condition image database 206 is created by adding noise, via adder operation 204, with the noise having a fixed MSE=σ; an image pair of original image 102 and distorted image 106 is then used together. This pair is used in the procedure depicted in FIG. 1 to synthesize a third image (synthesized image 114). This procedure is then repeated for every original image in the database. The procedure illustrated in FIG. 2 can be repeated for different values of MSE (as shown in FIG. 3A-B), to create correspondingly different synthesized databases. Although in this specification, MSE has been used as an example, other distance measures like Root Mean Square Error or Peak Signal to Noise Ratio, may also be used, as is well known to those skilled in the art.

Because any synthesized image 114 is created with respect to an original image 102, synthesized image 114 should look similar to original image 102. However, there are also subtle variations and differences between original image 102 and synthesized image 114. According to one embodiment of the present invention, by creating different synthetic databases each with a different MSE or $QM_1$, a method to create and control intra-subject variably is disclosed herein. Such intra-subject variability can also be created by using different perceptually-based quality metrics $QM_2$. Creation of entire databases which encompass significant, meaningful, and controlled levels of intra-subject variability is important scientifically and economically.

As an illustrative example, the procedure depicted in FIG. 2 was used to generate databases 300A of structural MRI, shown in FIG. 3A, which are two-dimensional images oriented mid-axially to the brain. Database 302A consisted of MRIs from over 100 subjects. FIG. 3A shows an example consisting of four center slice original images 302A (left), initial condition images 304A (center), and final synthesized images 306A (right). Each pair of initial condition and synthesized images in 304A and 306A, respectively, have nearly identical MSE relative to the corresponding original image in original images 302A. MSE=$\sigma_1$ of all initial condition images 304A are approximately the same in this experiment; the level of noise used is considered low in this example database. As is shown in FIG. 3A, quality measure $QM_1$ in this example is MSE and $QM_2$ is SSIM.

FIG. 3B shows a similar example of databases 300B where MSE=$\sigma_2$ was higher. The resultant initial condition images 304B look much noisier and the perceptual quality of synthesized images 306B is also somewhat worse. This illustrates the intra-subject variability that can be obtained with this method. The quality measure, $QM_2$, for both databases 300A and 300B in FIGS. 3A and 3B was the SSIM. This will be contrasted with the better results obtained with the GM family of quality measures, to be discussed below.

Description of New GM Family of Quality Metrics

According to an embodiment of the present invention, a new family of full-reference image quality metrics, based on a ratio of Generalized Means (GM), is described herein. The new family of full-reference image quality metrics is found to be more useful than the conventional SSIM. The new family of metrics overcomes the problems with the SSIM identified previously. Specifically, unlike the SSIM, they are not sensitive to even large misalignments between two images. Further, the new family of metrics works well even for images which possess large, relatively flat regions, such as human irises and structural MRIs.

Figure 4:
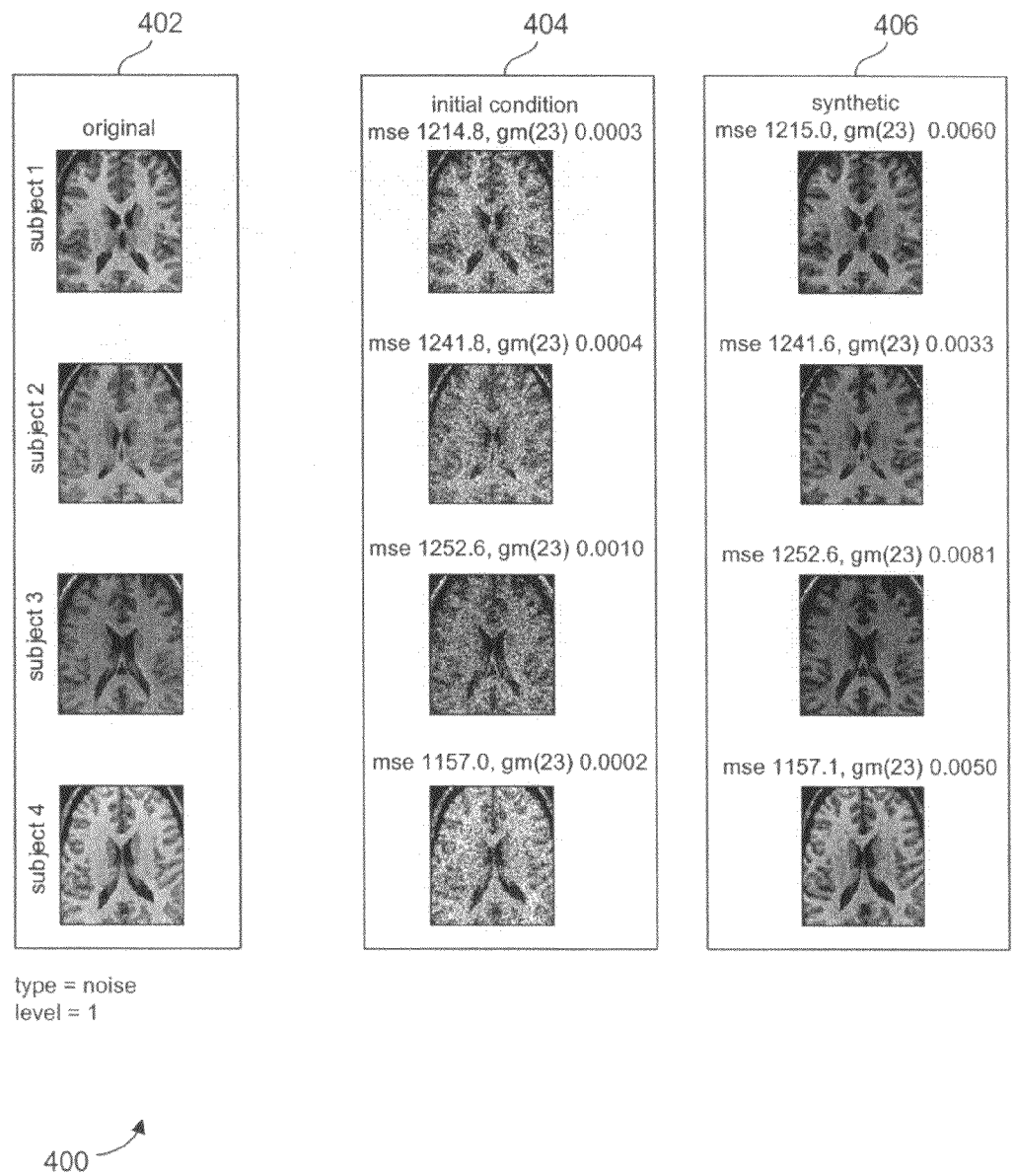
FIG. 4 illustrates the results of an optimization procedure using one from a family of quality metrics described by various embodiments of the present invention.

As a motivation for the discussion to follow, FIG. 4 shows a portion of the same databases as in FIGS. 3A and 3B, respectively. FIG. 4 depicts an exemplary case where one of the GM family of measures was used for $QM_2$, namely GM(23) which was the quality measure $QM_2$ optimized to produce FIG. 4. The same corresponding levels of noise were used in FIG. 4 as were used in FIG. 3A. It can be seen by comparing FIG. 4 with FIG. 3A that the GM quality measure results in GM synthesized images 404 in FIG. 4 look more similar to the original images 402. In particular, the GM synthesized images 404 do not suffer from relatively large regions that appear "washed out," or much brighter than the corresponding regions of the original images 402, as is the case in FIG. 3A.

Therefore, a new family of full-reference quality measures that can be used in a synthesis procedure to create more realistic images, especially (but not exclusively) biologically-based images has been described herein. This new family of quality measures can also be used in other image processing tasks like content-based image retrieval (CBIR) and computer vision, and/or image synthesis applications well known to those skilled in the art.

Mathematical Description of New Family of Quality Metrics

An image which is highly random in the spatial domain will possess a flat or white magnitude spectrum. Conversely, a predictable or redundant image will possess a colored spectrum; that is, the frequency spectrum exhibits peaks. Such redundancy can be removed without information loss, for example, by linear prediction. The Spectral Flatness Measure (SFM) arises in the theory of linear prediction and has been widely used to quantify redundancy for signals like images and speech. See:

Jayant, N., and Noll, P. (1984) *Digital Coding of Waveforms*. Englewood Cliffs: Prentice Hall;

Jacobs, P., Belhumeur, D., and Basri, R., "Comparing Images under Variable Illumination," *cvpr*, p. 610, *Proceedings,*
1998 *IEEE Computer Society Conference on Computer Vision and Pattern Recognition* (CVPR '98), 1998;

Kundu, A., Mitra, S, and Vaidyanathan, P., "Application of two-dimensional generalized mean filtering for removal of impulse noises from images", *Acoustics, Speech, and Signal Processing, IEEE Transactions on*, Volume 32, Issue 3, June 1984 Page(s): 600-609; and Markel, J., And Gray, A., *Linear Prediction of Speech*, Springer-Verlag, Berlin Heidelberg, 1976.

The SFM can be computed by taking the ratio of the harmonic to the arithmetic mean of the magnitude-squared, discrete spectrum. The two means involved in the ratio are special cases of the generalized mean (GM). Below, the application of GMs in image processing is briefly reviewed. Next, a mathematical formulation is developed where ratios of linear combinations of GMs define a class of full-reference image quality measures.

Conventional Applications of Generalized Means to Image Processing

One of the first applications of GMs was as a type of nonlinear filter to remove impulse noise. GMs have also been used to compare the illumination conditions of two images. Ratios of GM in both spatial and frequency domains have been shown to be useful as no-reference measures of image quality. However, other reported image processing applications of GMs are rare. GMs also appear infrequently in other engineering applications, although they have been sparingly used in pattern recognition studies, which is beyond the scope of this specification.

Mathematical Formulation of the Generalized Mean

In this study, each two-dimensional image matrix is first converted into a one-dimensional vector by appending together the image columns. The resultant image vector, I, contains N pixels (bold font is used for vectors and matrices). The $i^{th}$ pixel is denoted $I_i$, i=1, 2, ..., N. All images in this study are represented on an 8 bit scale, so that each pixel intensity is encoded with $2^8$ levels of gray, and thus $0 \leq I_i \leq 2^8 - 1$.

The $p^{th}$ GM is defined as:

$$M_p(I) \equiv \frac{1}{N}\left[\sum_{i=1}^{N} I_i^p\right]^{\frac{1}{p}}. \qquad (1)$$

Note that (1) is defined only for $I_i$ strictly positive. A common fix, and the one used in this study, is to replace values of zero with a small positive value. The GMs obey the following inequality:

$$M_p(I) \leq M_{p+i}(I) \forall p. \qquad (2)$$

Note that p=1 and p=2 in (1) correspond to the arithmetic and root-mean-square, respectively. In the limit as p→−1 and p→0, the GM in (1) becomes the harmonic and geometric mean, respectively. Only these four values of p are considered in this study. For convenience, we use the notation $M_{p_r}(I)$ to denote the GM for $p_r$, where r=1, 2, 3, 4, and where $p_1$=−1, $p_2$=0, $p_3$=1, and $p_4$=2. Table 1 specifies each GM and the gradient of $M_{p_r}(I)$ with respect to I, $\nabla_I M_{p_r}(I)$, which is a vector with elements $$\frac{\partial}{\partial I_i} M_{p_r}(I), i = 1, 2, \ldots, N.$$

Gradient expressions are necessary for the image synthesis techniques discussed herein.

TABLE I

Definitions, Mathematical expressions, and Gradients of four GMs.

| r | $p_r$ | GM Definition | Expression $M_{p_r}(I)$ | Gradient $\frac{\partial}{\partial I_i} M_{p_r}(I)$ |
|---|---|---|---|---|
| 1 | −1 | Harmonic | $\left[\frac{1}{N}\sum_{i=1}^{N} I_i^{-1}\right]^{-1}$ | $\frac{[M_{-1}(I)]^2}{NI_i^2}$ |
| 2 | 0 | Geometric | $\left[\prod_{i=1}^{N} I_i\right]^{\frac{1}{N}}$ | $\frac{M_0(I)}{NI_i}$ |
| 3 | 1 | Arithmetic | $\frac{1}{N}\sum_{i=1}^{N} I_i$ | $\frac{1}{N}$ |
| 4 | 2 | Root-Mean-Square | $\left[\frac{1}{N}\sum_{i=1}^{N} I_i^2\right]^{\frac{1}{2}}$ | $\frac{2I_i}{NM_2(I)}$ |

Ratios of Linear Combination of GMs

For an image, I, we define the following ratio:

$$R_{r_{low},r_{high}}(I) \equiv \frac{\sum_{r=r_{low}}^{r_{high}-1} M_{p_r}(I)}{(r_{high} - r_{low})M_{p_{r_{high}}}(I)}, \quad (3)$$

$r_{low} < r_{high}, 1 \leq r \leq 4$.

Using (2) with (3) implies that each ratio will have the convenient range:

$$0 \leq R_{r_{low},r_{high}}(I) \leq 1. \quad (4)$$

A number of possible combinations of $r_{low}$ and $r_{high}$ can be considered. For example, with $r_{low}=2$ and $r_{high}=3$, the ratio of (3) becomes:

$$R_{2,3}(I) = \frac{M_2(I)}{M_3(I)} = \frac{\text{geometric mean}(I)}{\text{arithmetic mean}(I)}. \quad (5)$$

This particular ratio can be considered a generalized spatial flatness measure, in contrast to the more familiar spectral flatness measure (SFM) discussed previously.

Full-Reference Image Quality Measures

Defined are a new class of full-reference image quality measures between images X and Y based on the ratio of (3) as follows:

$$RR_{r_{low},r_{high}}(X,Y) \nabla [R_{r_{low},r_{high}}(X) - R_{r_{low},r_{high}}(Y)]^2. \quad (6)$$

It can be appreciated that unlike most full-reference image quality measures, including the mean square error and the SSIM, this class of measure does not involve differences of individual pixels between two images, or correlations among pixels or local regions between two images; rather, the measure is global to each image and a difference is then taken between two scalars.

To be used in image synthesis, an expression for the gradient of (6) with respect to the image Y is:

$$\nabla_Y RR_{r_{low},r_{high}}(X,Y) = 2\nabla_Y R_{r_{low},r_{high}}(Y)[R_{r_{low},r_{high}}(Y) - R_{r_{low},r_{high}}(X)]. \quad (7)$$

The necessary gradient can be evaluated using (7) along with (3), the quotient rule for derivatives, and table 1. The actual optimization procedure involving gradient descent is well described in Wang, Z., Bovik, A., and Lu, L. (2002a) "Why is image quality assessment so difficult?" *Proceedings, IEEE International Conference on Acoustics Speech and Signal Processing*. 4, 3313-3316.

For the special case of $r_{low}=2$ and $r_{high}=3$, we use the simpler notation GM(23) to indicate the expression as shown in (6). The other members in this family of quality measures for other values of r are described analogously, and can be used in place of GM(23).

It is to be noted that the method of creating synthetic images can be implemented by a computer system comprising one or more computer program codes. It is also to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

CONCLUSION

While various embodiments of the present invention have been described above it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above described exemplary embodiments, but should be defined only in accordance with the following claims and their equivalents.

What is claimed is:

1. A method of synthesizing a synthetic image from an original real image, comprising:

adding noise to the original real image to obtain a distorted image;

applying an iterative optimization on the distorted image;

obtaining the synthetic image based on a constraint on the distorted image subject to a fixed first quality metric and a varying second quality metric, wherein the second quality metric is a ratio of generalized means and is independent of a correlation between local regions of two or more images, and the second quality metric is defined by;

$$R_{r_{low},r_{high}}(I) \equiv \frac{\sum_{r=r_{low}}^{r_{high}-1} M_{p_r}(I)}{(r_{high} - r_{low})M_{p_{r_{high}}}(I)},$$

$r_{low} < r_{high}, 1 \leq r \leq 4$ where r=1, 2, 3, 4, a $p^{th}$ GM for an image vector I having elements $I_i$ is defined as:

$$M_p(I) \equiv \frac{1}{N}\left[\sum_{i=1}^{N} I_i^p\right]^{\frac{1}{p}}$$

wherein N is a number of elements in the image vector I and subscripts $r_{low}$ and $r_{high}$ correspond to highest and lowest values for the variable r; and outputting the synthetic image to an output device.

2. The method of claim 1, wherein the obtaining the synthetic image further comprises:

measuring a value of the varying second quality metric for a first synthetic image obtained in the iterative optimization.

3. The method of claim 1, wherein the iterative optimization is stopped when a value of the varying second quality metric substantially equal to a predefined threshold value of the varying second quality metric is obtained.

4. The method of claim 1, further comprising maintaining a perceptual quality metric, for the synthetic image, invariant to any variations in spatial alignment, translation and rotation of the synthetic or the original real image.

5. The method of claim 4, wherein the synthetic image possesses a high perceptual similarity measured by the perceptual quality metric to the original real image independent of a value of a specified quality metric relative to the original real image.

6. The method of claim 1, further comprising:

adding noise to a database of original real images to obtain a database of distorted images;

applying the iterative optimization to the database of distorted images;

obtaining a database of synthesized images based on the constraint on the database of distorted images subject to a specified quality metric; and outputting the database of synthesized images to an output device.

7. The method of claim 1, wherein the original real image is one of iris images and magnetic resonance images (MRIs).

8. The method of claim 1, further comprising measuring the first quality metric between: the original real image and the distorted image and the original real image and the synthetic image by computing a mean square error (MSE).

9. A method of retrieving an image from a database of real and synthetic images, comprising:

identifying a target image with potential distortions;

comparing the target image with a real image using a full-reference image quality measure, wherein the full-reference image quality measure is a ratio of generalized means and is independent of a correlation between local regions of two or more images and is defined by:

$$R_{r_{low},r_{high}}(I) \equiv \frac{\sum_{r=r_{low}}^{r_{high}-1} M_{P_r}(I)}{(r_{high}-r_{low})M_{P_{r_{high}}}(I)}, r_{low} < r_{high}, 1 \leq r \leq 4$$

where r=1, 2, 3, 4, a $p^{th}$ GM for an image vector I having elements $I_i$ is defined as:

$$M_p(I) \equiv \frac{1}{N}\left[\sum_{i=1}^{N} I_i^p\right]^{\frac{1}{p}}$$

wherein N is a number of elements in the image vector I and subscripts $r_{low}$ and $r_{high}$ correspond to highest and lowest values for the variable r;

measuring a distance of the target image from the real image using a full-reference image quality metric, wherein the full-reference image quality metric is a measure of perceptual content of the image;

retrieving images from an image database that have substantially a same value of the full-reference image quality metric with respect to the real image as the target image; and outputting the retrieved images to an output device.

10. The method of claim 9, wherein the retrieving the images from the image database is based on a specific query from a user, when the target image is unavailable.

11. An image retrieval system comprising:

a first set of original real images;

a second set of distorted images created from the first set of original real images by adding noise, wherein each image of the second set has a fixed first mathematical distance from a corresponding image in the first set of original real images; and a third set of synthetic images created from the second set of distorted images by optimization, wherein each of the third set of synthetic images is based on one of the second set of distorted images and possesses the same said fixed mathematical distance from the image in the first set that corresponds to the one of the second set of distorted images, and wherein each of the third set of synthetic images has either a maximized or a minimized perceptual distance from the first set of original real images, wherein the perceptual distance is measured by a ratio of generalized means and is independent of a correlation between local regions of two or more images and is defined by:

$$R_{r_{low},r_{high}}(I) \equiv \frac{\sum_{r=r_{low}}^{r_{high}-1} M_{P_r}(I)}{(r_{high}-r_{low})M_{P_{r_{high}}}(I)}, r_{low} < r_{high}, 1 \leq r \leq 4$$

where r=1, 2, 3, 4, a $p^{th}$ GM for an image vector I having elements $I_i$ is defined as:

$$M_p(I) \equiv \frac{1}{N}\left[\sum_{i=1}^{N} I_i^p\right]^{\frac{1}{p}}$$

wherein N is a number of elements in the image vector I and subscripts $r_{low}$ and $r_{high}$ correspond to highest and lowest values for the variable r.

12. The image retrieval system of claim 11, wherein a quality metric measured in the third set of synthetic images serves as a candidate metric to a content based image retrieval (CBIR) system.

13. The image retrieval system of claim 11, wherein the first set of original real images includes at least one of iris images and magnetic resonance images (MRIs).

14. The image retrieval system of claim 11, wherein the mathematical distance is measured by mean square error (MSE) between original images in the first set and corresponding distorted images in the second set.

15. A computer program product comprising a non-transitory computer readable medium having computer program logic recorded thereon, said computer logic when executed by a processor enabling generating and retrieving synthetic images according to a method, said method comprising:
  generating a distorted image from an original image by adding noise while keeping a fixed mathematical distance from the original image, wherein the distorted image has a perceptual distance from the original image, measured by a ratio of generalized means and independent of a correlation between local regions of two or more images and defined by:

$$R_{r_{low},r_{high}}(I) \equiv \frac{\sum_{r=r_{low}}^{r_{high}-1} M_{p_r}(I)}{(r_{high}-r_{low})M_{p_{r_{high}}}(I)}, r_{low} < r_{high}, 1 \leq r \leq 4$$

where r=1, 2, 3, 4, a $p^{th}$ GM for an image vector I having elements $I_i$ is defined as:

$$M_p(I) \equiv \frac{1}{N}\left[\sum_{i=1}^{N} I_i^p\right]^{\frac{1}{p}}$$

wherein N is a number of elements in the image vector I and subscripts $n_{low}$ and $r_{high}$ correspond to highest and lowest values for the variable r;
  iteratively modifying the distorted image using an optimization technique;
  generating a synthetic image using the optimization technique such that the synthetic image has the same fixed mathematical distance from the original image as the distorted image, while having either a maximized or a minimized perceptual distance from the original image; and
  retrieving the synthetic image based on a query.

16. The computer program product of claim 15, wherein the query is a computer program code for computing generalized means.

17. The computer program code of claim 15, wherein the optimization technique further comprises a non-linear gradient descent optimization.

18. A method of synthesizing a synthetic image from an original real image, comprising:
  adding noise to the original real image to obtain a distorted image;
  applying an iterative optimization on the distorted image;
  obtaining the synthetic image based on a constraint on the distorted image subject to a fixed first quality metric and a varying second quality metric, wherein the second quality metric is a ratio of generalized means and is independent of a correlation between local regions of two or more images and is a Generalized Spatial Flatness Measure metric that is computed using a ratio of geometric and arithmetic means and is defined by:

$$R_{r_{low},r_{high}}(I) \equiv \frac{\sum_{r=r_{low}}^{r_{high}-1} M_{p_r}(I)}{(r_{high}-r_{low})M_{p_{r_{high}}}(I)}, r_{low} < r_{high}, 1 \leq r \leq 4$$

where r=1, 2, 3, 4, $r_{low}$=2 and $r_{high}$=3, a $p^{th}$ GM for an image vector I having elements $I_i$ is defined as:

$$M_p(I) \equiv \frac{1}{N}\left[\sum_{i=1}^{N} I_i^p\right]^{\frac{1}{p}}$$

wherein N is a number of elements in the image vector I; and
  outputting the synthetic image to an output device.

* * * * *